No. 831,769. PATENTED SEPT. 25, 1906.
O. O. BRAATEN & H. T. DISRUD.
BEATER CLEARER FOR THRESHING MACHINES.
APPLICATION FILED DEC. 5, 1905.

Witnesses
Louis R. Heinrichs
Herbert D. Lawson

Inventors
O. O. Braaten
H. T. Disrud
By W. T. Fitzgerald & Co.,
Attorneys

UNITED STATES PATENT OFFICE.

OLE O. BRAATEN AND HENRY T. DISRUD, OF BARSNESS, MINNESOTA.

BEATER-CLEARER FOR THRESHING-MACHINES.

No. 831,769.　　　　Specification of Letters Patent.　　　Patented Sept. 25, 1906.

Application filed December 5, 1905. Serial No. 290,372.

*To all whom it may concern:*

Be it known that we, OLE O. BRAATEN and HENRY T. DISRUD, citizens of the United States, residing at Barsness, in the county of Pope and State of Minnesota, have invented certain new and useful Improvements in Beater-Clearers for Threshing-Machines; and we do hereby declare the following to be a full, clear, and exact description of the invention, such as will enable others skilled in the art to which it appertains to make and use the same.

Our invention relates to combing attachments for threshing-machines; and its object is to provide a device of this character which can be readily connected to the shaker of a machine and which facilitates the threshing of flax.

The great objection heretofore experienced with threshing-machines utilizing beaters has been the fact that the flax straw will wind around the beater until it thoroughly covers it, and unless the machine is stopped and the straw cut from the beater some portion of the mechanism will be broken. As the operation of cleaning the beater of flax straw is a difficult one considerable time is lost, and therefore the threshing of flax becomes very expensive.

The object of our invention is to provide a comb which moves with the shaker and has teeth adapted to keep the straw away from the beater and to pick therefrom any of the material which may in any manner become engaged thereby.

The invention consists of a bar from which extend a plurality of prongs, and this bar has means for fastening it to the shaker in such a manner that when said shaker moves upward and downward the prongs will be carried toward and away from the beater and close to its periphery.

The invention also consists in further novel construction and combination of parts hereinafter more fully described and claimed.

In the accompanying drawings we have shown the preferred form of our invention.

Figure 1:
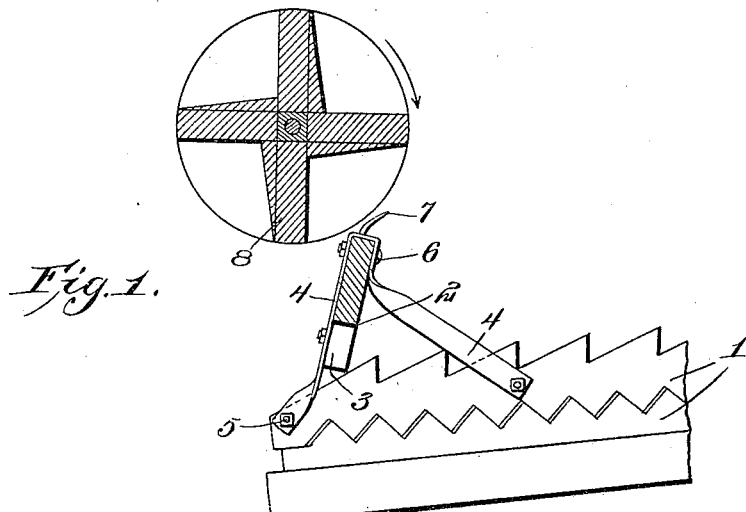
Figure 2:
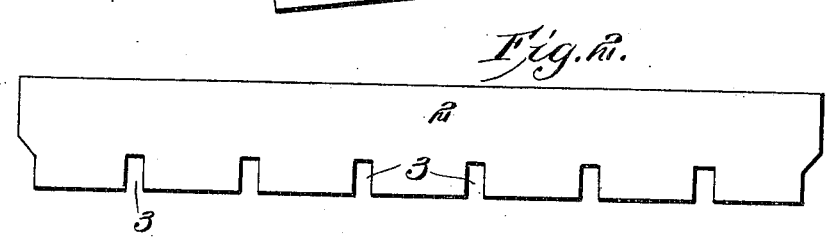
Figure 3:
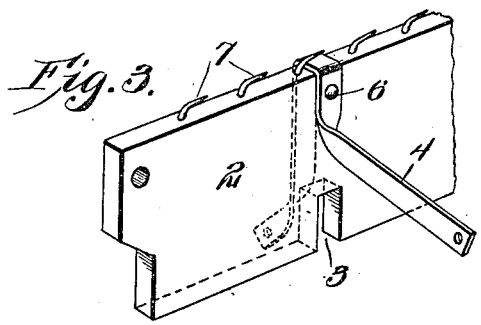

In said drawings, Figure 1 is a section through the beater of a threshing-machine and our improved comb, a portion of the shaker being shown in elevation. Fig. 2 is a face view of the bar of the comb, and Fig. 3 is a perspective view of one end of the complete comb.

Referring to the figures by numerals of reference, 1 1 are the toothed bars of a shaker, and mounted thereon and extending transversely thereof is a bar 2, having a series of slots 3 in its lower edge for the reception of the bars 1. The comb-bar 2 is fastened to the shaker-bars by means of metallic strips 4, which are bolted or otherwise fastened upon the comb-bar 2 and have their ends twisted so as to present flat faces to bars 1. These ends are fastened to the shaker-bars by means of bolts 5 or in any other preferred manner and also secured in a similar way to the forward face of the comb-bar 2. Each of the straps overlaps the upper edge of the comb-bar and is secured upon opposite faces thereof by a bolt 6, extending therethrough. Projecting upward from the top edge of the bar 2 is a series of prongs 7, and all these prongs extend backward and normally lie close to the periphery of a beater 8.

It will be understood that when the beater rotates in the direction indicated by the arrow in Fig. 1 the flax will be kept therefrom by the prongs 7, and there is no danger of the flax straw becoming wound upon the beater and interfering with its operation. However, should any of the straw be engaged by the beater it will be picked therefrom during the upward movement of the prongs, which at that time nearly contacts with the beater.

We have found that by using a device such as herein described a considerable saving of time and labor is involved, because heretofore it has been necessary in order to remove straw from the beater to get into the machine and use a knife for cutting the straw from the parts. In this manner much time has been wasted, and the operation of threshing flax straw has therefore been rendered very expensive.

While the attachment may be used in connection with any form of threshing-machine using a rotary beater, it is particularly adapted for what is known as a "New Peerless" threshing-machine.

Having thus fully described our invention, what we claim as new, and desire to secure by Letters Patent, is—

1. In a threshing-machine the combination with a shaker and a rotary beater adjacent thereto; of a slotted bar mounted upon the shaker, said slots adapted to receive the bars of the shaker, straps secured upon the slotted bar and adapted to rigidly connect the same to the shaker and curved prongs extending from one edge of the slotted bar into close proximity to the rotary beater.

2. An attachment for threshing-machines comprising the combination with a shaker having shaker-bars; of a bar having slots in its lower edge to receive the shaker-bars, means for securing the bar to the shaker, and prongs extending from one edge of the bar.

3. An attachment for threshing-machines comprising a shaker, a slotted bar, said slots adapted to receive the bars of the shaker, straps secured to said slotted bar, the opposite ends of said straps being secured to the shaker, and prongs extending from one edge of said slotted bar.

In testimony whereof we have signed our names to this specification in the presence of two subscribing witnesses.

OLE O. BRAATEN.
HENRY T. DISRUD.

Witnesses:
HENRY L. HOLTEN,
MARTIN FEIGUM.